(12) United States Patent
Leung et al.

(10) Patent No.: US 11,728,679 B2
(45) Date of Patent: Aug. 15, 2023

(54) MICROPHONE, A HEADPHONE, A KIT COMPRISING THE MICROPHONE AND THE HEADPHONE, AND A METHOD FOR PROCESSING SOUND USING THE KIT

(71) Applicant: Linear Flux Company Limited, Hong Kong (CN)

(72) Inventors: David Chung-Sing Leung, Hong Kong (CN); Einstein Celso Galang, Daly City, CA (US); Nicolas Jean Declunder, Vaureal (FR)

(73) Assignee: LINEAR FLUX COMPANY LIMITED, Kowloon (HK)

( * ) Notice: Subject to any disclaimer, the term of this patent is extended or adjusted under 35 U.S.C. 154(b) by 117 days.

(21) Appl. No.: 17/383,202

(22) Filed: Jul. 22, 2021

(65) Prior Publication Data
US 2022/0029456 A1   Jan. 27, 2022

Related U.S. Application Data

(60) Provisional application No. 63/055,149, filed on Jul. 22, 2020.

(51) Int. Cl.
*H04R 1/10* (2006.01)
*H02J 50/00* (2016.01)

(52) U.S. Cl.
CPC .......... *H02J 50/005* (2020.01); *H04R 1/1016* (2013.01); *H04R 1/1041* (2013.01);
(Continued)

(58) Field of Classification Search
CPC ... H02J 50/005; H04R 1/1016; H04R 1/1041; H04R 1/1083
See application file for complete search history.

(56) References Cited

U.S. PATENT DOCUMENTS 8,818,461 B2 *   8/2014   Cybart ................. H04R 1/1066
                                                    455/569.1
10,448,151 B1 *  10/2019  McNair .................. H04R 3/005
(Continued)

*Primary Examiner* — Simon King
(74) *Attorney, Agent, or Firm* — Rabin & Berdo, P.C.

(57) ABSTRACT

The present invention relates to a kit comprising a microphone and a headphone, and also a case member provided with a first cut-out region for accommodating the microphone and a second cut-out region for accommodating the headphone as well as electronics means for charging the microphone and/or the headphone; the microphone comprising: a sound-receiving portion; a headphone connecting portion; an extension portion connecting a distal end arranged to connect to the sound-receiving portion and a proximal end opposite the distal end thereof and arranged to connect to the headphone connecting portion, the proximal end extending a distance from the distal end such that a voice signal received is greater than the environmental noise thus yielding a higher signal to noise ratio; the headphone comprising: a main body portion dimensioned for adapting to the user's ear contour to retain the headphone on the ear; a microphone connecting portion provided on the main body portion; each of the headphone connecting portion and the microphone connecting portion is provided with magnets, when the microphone is in use, the microphone is arranged to detachably connect to the headphone by means of their respective the magnets. The kit of the present invention allows the use of a boom microphone in a portable headphone.

15 Claims, 3 Drawing Sheets

(52) U.S. Cl.
    CPC ....... *H04R 1/1083* (2013.01); *H04R 2420/07* (2013.01); *H04R 2460/17* (2013.01)

(56) References Cited

U.S. PATENT DOCUMENTS

| | | | |
|---|---|---|---|
| 10,805,703 B1* | 10/2020 | Bikumala | H04R 5/033 |
| 2009/0116678 A1* | 5/2009 | Bevirt | H04M 1/05 |
| | | | 381/381 |
| 2009/0323975 A1* | 12/2009 | Groesch | H04R 1/1091 |
| | | | 381/71.1 |
| 2016/0105755 A1* | 4/2016 | Olsson | H04R 3/007 |
| | | | 381/71.6 |
| 2018/0226064 A1* | 8/2018 | Seagriff | H04L 63/0428 |
| 2020/0288234 A1* | 9/2020 | Fletcher | H04R 1/1066 |

* cited by examiner

MICROPHONE, A HEADPHONE, A KIT COMPRISING THE MICROPHONE AND THE HEADPHONE, AND A METHOD FOR PROCESSING SOUND USING THE KIT

TECHNICAL FIELD

The present invention relates to the field of mechanical design and manufacture, specifically to the field of headphone design and manufacture, and more specifically to a microphone, a headphone and a kit comprising the microphone and the headphone.

BACKGROUND

The use of smart phones, tablets, and mobile devices continues to rise and with it so does the use of wireless headphones, to consume audio as well as to communicate.

The market has focused on all-inclusive products that have microphones internal to the headphone housings that compensate for lack of voice intelligibility via signal processing. The issue with these types of headphones on the market today is that they yield poor voice quality and intelligibility. A user speaks via the headphone and the person on the other side cannot understand what is being said because the speaker's voice becomes unnatural, digitized and inaudible, or the person hears ambient surrounding noise that overpowers the conversation or even has physical interference via wind blowing over the headphone that covers the targeted voice pickup.

These types of headphones on the market currently use single microphone or microphone arrays that perform a lot of signal processing to try and isolate the voice pickup, however, this also degrades the voice output quality, due to the fact that all sound picked up by the microphone and system must be processed to isolate the voice. This yields a very unnatural, digitized and often unlistenable voice output.

The market is keen on keeping the size and formfactor of the headphone small to preserve portability and therefore, the market has overlooked the usefulness and advantages of mechanical solutions for microphone intelligibility due to the focus on size and compactness. Any better performing solutions, such as boom microphone, are not considered. Mechanical boom microphone is typically applied to larger wired over-ear headphones. When this type of external microphone is attached to a headphone, it is typically by means of an insertion plug that drastically increases the size of the product and compromises mobility, use and also features such as waterproof rating. Further, when the boom microphone attached to an in-ear headphone, the headphone would easily detach from a user's ear due to the shift of the center of overall mass, bringing inconveniences to users and making users stay away from using a boom microphone, which indeed provides better performance. Since the microphone is closer to the user's mouth, thus the user's voice signal received is greater than the environmental noise received therefore yielding a higher signal to noise ratio for even better signal processing.

SUMMARY OF THE INVENTION

The present invention seeks to address these problems, or at least to provide an alternative to the public. It is desirable to provide a microphone, a headphone, a kit comprising the microphone and the headphone, and a method for processing sound using the kit, capable of solving the above-mentioned technical problem of the difficulty of existing portable wireless headphones being compact in size, effective in terms of sound-receiving as well as low in cost. The microphone and headphone according to the invention allow the microphone and headphone to be detachably connected to each other, thereby reducing the storage volume of the entire kit when the microphone is not in use or when the entire kit is stored. In particular, the headphone described in this application is a wireless headphone but also includes wired headphone.

According to a first aspect of the invention, it provides a kit, comprising a case member, a microphone, and a wireless headphone, wherein:

the case member is provided with a first cut-out region for accommodating the microphone and a second cut-out region for accommodating the wireless headphone, and is provided with electronics means for charging the microphone and/or the wireless headphone;

the microphone comprising: a sound-receiving portion, having a sound-receiving component for receiving external sound information; a headphone connecting portion; an extension portion connecting a distal end and a proximal end opposite the distal end thereof, the distal end is arranged to connect to the sound-receiving portion, the proximal end extending a distance from the distal end and is arranged to connect to the headphone connecting portion, such that a user's voice signal received is greater than the environmental noise received thus yielding a higher signal to noise ratio; and the wireless headphone comprising: a main body portion dimensioned for adapting to the user's ear contour to retain the wireless headphone on the ear; a microphone connecting portion provided on the main body portion;

wherein each of the headphone connecting portion and the microphone connecting portion is provided with magnets, when the microphone is in use, the microphone is arranged to detachably connect to the wireless headphone by means of their respective magnets, thereby the magnets of the microphone and the wireless headphone are configured to adapt only one single mating relationship therebetween, allowing the microphone connected to the wireless headphone only in one single orientation.

The kit according to the invention allows disassembling the headphone and microphone to reduce its storage volume while maintaining the sound-receiving quality of the microphone. Further, it provides freedom to user to only connect the microphone to the headphone when in need and also increases the reliability and durability of these tiny parts. When the microphone is torqued, the magnetic connection will detach, allowing the separate pieces to be undamaged, whereas a single structure system would break.

According to a second aspect of the invention, it also provides a microphone for a headphone, comprising:

a sound-receiving portion, comprising a sound-receiving component for obtaining external sound information;

an extension portion, having a distal end and a proximal end opposite the distal end, the distal end is connected to the sound-receiving portion and the proximal end extends a distance from the distal end such that a user's voice signal received is greater than the environmental noise received thus yielding a higher signal to noise ratio; and a headphone connecting portion, connected to the proximal end of the extension portion, the headphone connecting portion is provided with a headphone connector, the headphone connector is configured so that the microphone is detachably connected to the headphone by means of the headphone connector.

According to a preferred embodiment of the microphone for a headphone of the present invention, the headphone connector comprises ferromagnetic materials which are configured to engage with a microphone connector on the headphone.

According to a preferred embodiment of the microphone for a headphone of the present invention, the microphone connector comprises ferromagnetic materials. Advantageously, at least one of the ferromagnetic materials of the headphone connector and the ferromagnetic materials of the microphone connector are magnets.

According to a preferred embodiment of the microphone for a headphone of the present invention, the extension portion is a hollow tubular member that is provided with a microphone signal wire, the microphone signal wire couples the output of the sound-receiving component to the headphone connector.

According to a preferred embodiment of the microphone for a headphone of the present invention, the hollow tubular member is preferably a conductor.

According to a preferred embodiment of the microphone for a headphone of the present invention, the headphone connector is embedded in the surface of the headphone connecting portion, at least providing appealing aesthetic to the headphone.

Compared with the microphone integrated in the headphone, the microphone according to the present invention has better sound-receiving quality when comparing with those headphones with microphone integrally built-into the headphone body. In one embodiment, noise reduction processing can be avoided with the subject invention.

Furthermore, the third aspect of the present invention also provides a headphone comprising:

a main body portion, sized and shaped for adapting to a user's ear contour to retain the headphone in the ear;

a microphone connecting portion, provided on the main body portion, the microphone connecting portion is provided with a microphone connector, the microphone connector is configured such that the headphone is detachably connected to a microphone by means of the microphone connector.

According to a preferred embodiment of the headphone of the present invention, the microphone connector comprises ferromagnetic materials which are configured to engage with a headphone connector on the microphone.

According to a preferred embodiment of the headphone of the present invention, the headphone connector comprises ferromagnetic materials, and at least one of the ferromagnetic materials of the headphone connector and the ferromagnetic materials of the microphone connector are magnets.

According to a preferred embodiment of the headphone of the present invention, the headphone further comprises a transmission component for transmitting signals to and/or receiving signals from the outside, the transmission component is coupled to the microphone connecting by means of a headphone signal wire.

According to a preferred embodiment of the headphone of the present invention, the main body portion provided with a ergonomic ear contour retaining portion attached to the main body portion for enhancing the attachment of the headphone to the ear. Advantageously, the ergonomic ear contour retaining portion can be configured as any shape desired as long as such can enhance the attachment of the headphone to the ear.

According to a preferred embodiment of the headphone of the present invention, the microphone connecting portion comprises an insertion hole provided on the main body portion, the microphone connector is embedded in the inner surface of the insertion hole.

According to a preferred embodiment of the microphone and the headphone of the present invention, the microphone housing and the headphone housing each provides a region for accommodating the headphone connector and the microphone connector, respectively. More preferably, the microphone housing and the headphone housing each provides an outward facing aperture for embedding the headphone connector and the microphone connector, respectively. In these preferred embodiments, the microphone housing and the headphone housing define a guiding system to realize the magnetic interaction between the microphone and the headphone as forementioned, and counter sheer forces due to weight of the microphone and/or headphone, or exterior force exerted on the guiding system that are exerted on the joining interface between the microphone and the headphone, thereby improving the mechanical attachment stability.

In addition, the fifth aspect of the present invention provides a kit, comprising:

the above-discussed microphone for a headphone; and the above-discussed headphone;

wherein the headphone connector and the microphone connector can be detachably connected to each other.

According to a preferred embodiment of the kit of the present invention, the headphone connector and the microphone connector are configured so that only one single mating relationship exists therebetween, such that the microphone is connected to the headphone only in one single orientation. In a more preferred embodiment, the microphone attached to the headphone is adapted to assume a first tilting angle pointing upwards and/or to assume a second tilting angle pointing downwards.

According to a preferred embodiment of the kit of the present invention, in a state where the microphone is connected to the headphone, the microphone connector and the headphone connector are electrically coupled to each other, whereby signals transmitted between the microphone connector and the headphone connector.

The kit according to the present invention, while ensuring the sound-receiving quality of microphone, allows the headphone and microphone to be disassembled to reduce their storage volume, and also has the advantages of the above-mentioned microphone and headphone.

According to the sixth aspect of the present invention, it provides a method to detachably connect the microphone to the headphone by means of magnetic interaction between ferromagnetic material of the microphone connector and the ferromagnetic material of the headphone connector. Preferably, in one embodiment, configuring either the ferromagnetic material of the microphone connector or the ferromagnetic material of the headphone connector is magnet. More preferably, in another embodiment, configuring both of the ferromagnetic material of the microphone connector and the ferromagnetic material of the headphone connector are magnet. The magnetic interaction taught by the subject invention enables quick-fit engagement between the headphone and the microphone, and avoids the use of conventional plug-in type of boom microphone. Advantageously, in one embodiment, such magnetic interaction also enables signal communication between the headphone and the microphone when connected or engaged.

In one embodiment, advantageously, the method relates to providing the headphone with a retaining portion, in particular attached to the main body portion of the headphone, for enhancing the attachment of the headphone to the ear.

DESCRIPTION OF THE DRAWINGS

This document includes drawings to provide further understanding of various embodiments. The drawings are incorporated into this specification and constitute a part of this specification. The accompanying drawings illustrate various embodiments described herein, and, together with the text description, are used to explain the principles and operations of the claimed subject matter.

With reference to the above objectives, the technical features of the present invention are clearly described below; and its advantages are apparent from the following detailed description with reference to the accompanying drawings, which illustrate the preferred embodiments of the present invention by way of example, without limiting the scope of the present invention.

In the attached drawings:

FIG. 1 is a perspective schematic diagram of a kit according to a preferred embodiment of the present invention, in which both the microphone and the headphone are placed in the box body member.

FIG. 2 is a schematic front view of the kit shown in FIG. 1.

FIG. 3 is a schematic diagram of a headphone according to a preferred embodiment of the present invention.

FIG. 4 is a schematic diagram of a microphone according to a preferred embodiment of the present invention.

FIG. 5 is a schematic diagram of the headphone and microphone in FIGS. 3 and 4 after being assembled.

FIG. 6 is a schematic diagram of headphone according to another preferred embodiment of the present invention.

FIG. 7 is a schematic diagram of the headphone shown in FIG. 6 after being assembled with a microphone according to another preferred embodiment of the present invention.

LIST OF REFERENCE NUMERALS

Figure 1:
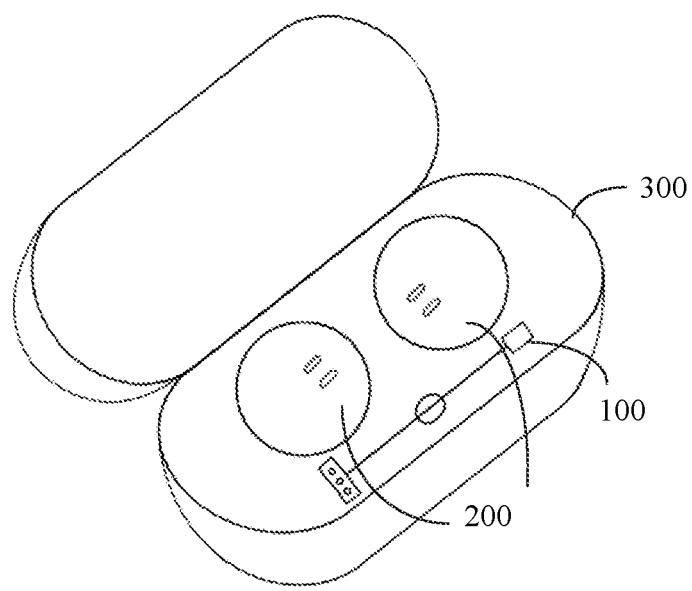

100 microphone
110 sound-receiving portion
120 extension portion
121 distal end
122 proximal end
130 headphone connecting portion
131 headphone connector
200 headphone
210 main body portion
211 ergonomic ear contour retaining portion
212 ear-tip
220 microphone connecting portion
221 microphone connector
300 case member

DETAILED DESCRIPTION OF EMBODIMENTS

The embodiments of the present invention will now be described in detail, and examples of these embodiments are shown in the drawings and described below.

Although the present invention will be described in conjunction with exemplary embodiments, it should be understood that this specification is not intended to limit the present invention to those illustrated embodiments. On the contrary, the present invention is intended to cover not only these exemplary embodiments, but also various alternative forms, modifications, equivalent forms, and other embodiments that can be included within the spirit and scope of the present invention.

In order to facilitate the explanation and precise definition of the technical solutions of the present invention, the terms "upper", "lower", "inner" and "outer" are used to refer to the positions of the features of the exemplary embodiments shown in the drawings to describe these features.

Figure 2:
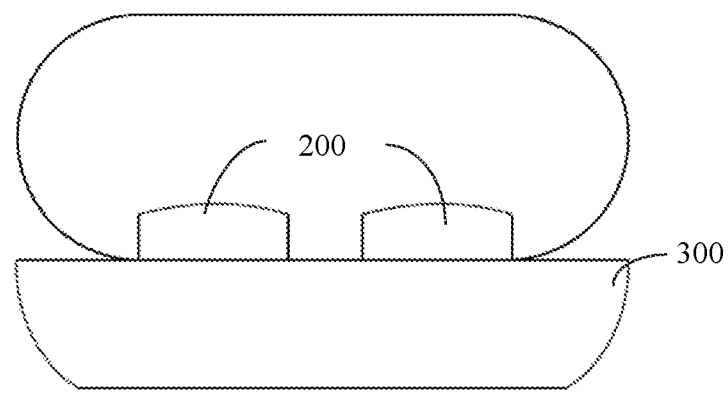

FIG. 1 and FIG. 2 show a kit according to a preferred embodiment of the present invention, which includes a case member 300, a microphone 100 in the type of boom microphone, and a headphone 200. It should be understood at this point that although the headphone 200 shown in the drawings of the present application are in the form of wireless headphones, those skilled in the art could understand that various aspects of the present application are also applicable to wired headphones.

As shown in FIGS. 1 and 2, the case member 300 may include two parts pivotally coupled to each other, in which a first upper part is configured as a lid with respect to a second lower part, which is configured as a base member for storing the microphone 100 and the headphone 200.

As shown in FIG. 1, the upper surface of the second lower of the case member 300 is provided with a first cut-out region for accommodating the microphone 100 and a second cut-out region for accommodating the headphone 200. Besides the embodiment as shown in FIG. 1, those skilled in the art could understand that the first cut-out region and the second cut-out region can be provided in one or both of the above-mentioned two parts according to actual needs when the invention is in use. The above-mentioned first cut-out region and second cut-out region may be recessed from the surface of the same part of the case member 300. It should be noted at this point that although the second cut-out region may be arranged below the two first cut-out regions as in FIG. 1, the second cut-out region may alternatively be arranged above the two first cut-out regions or between the two first cut-out regions according to actual needs when the invention is in use. In addition, although the second cut-out region shown in FIG. 1 extends substantially along a straight line, the second cut-out region may also extend along a path in other shape according to actual needs.

In addition, the case member 300 is also provided with electronic means or an electronic device for accommodating and/or for charging the microphone 100 and/or the headphone 200. Such electronic devices may include contact-type or non-contact-type chargers, which could reasonably be selected by those skilled in the art according to actual needs. In addition, such an electronic device may generally include a connector or a port provided on the case member 300 for connecting with a charging cable.

Figure 3:
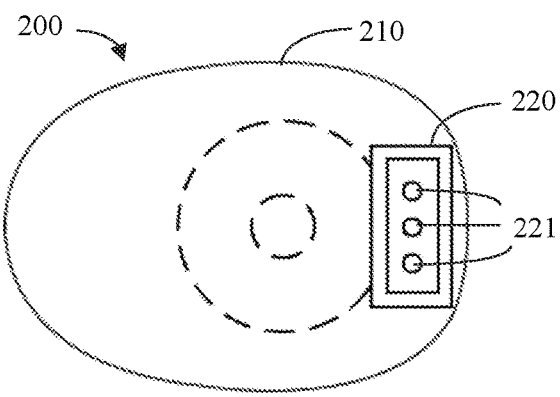

Referring to FIG. 3, the headphone 200 includes a main body portion 210 and a microphone connecting portion 220. The main body 210 is sized and shaped for adapting to a user's ear contour to retain the headphone 200 in the ear. The microphone connecting portion 220 is provided on the main body portion 210. The microphone connecting portion 220 is provided with a microphone connector 221 that is configured to allow the headphone 200 detachably connected to the microphone 100 via the microphone connector 221. The microphone connector 221 includes a ferromagnetic material configured to engage with a headphone connector 131 on the microphone 100 (please refer to FIG. 4). Selected example of the ferromagnetic material can be transition metal including but not limited to iron, cobalt, oxides thereof, and alloys thereof, magnet, magnetic tape, magnetic interface, and etc. Still in FIG. 3, although there are 3 microphone connectors 221 in the microphone connecting portion 220, it should be understood that those skilled in the art could adjust the number of microphone connector 221 according to actual needs, for example, the features or functions provided by the headphone.

In a preferred embodiment, the headphone 200 may further include a transmission component for transmitting signals to and/or receiving signals from the outside, and the transmission component is coupled to the microphone connector 221 via the headphone signal wire.

It should also be noted at this point that the shape of the headphone shown in the drawings is only an example, and those skilled in the art could select headphones with other shapes according to actual needs. In addition, although the kit in FIG. 1 shows two headphone parts having substantially the same headphone body, the kit may also include only one headphone part. Although the headphone in FIG. 3 is the type of wireless, a person skilled in the art could understand directly and unambiguously that at least the features of the microphone connecting portion 220 and the microphone connector 221 can also be configured to the headphone that is in wired type.

Figure 4:
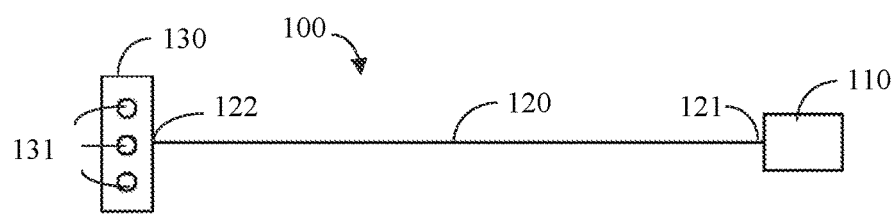

FIG. 4 illustrates the above-mentioned microphone 100, which is in the type of boom microphone, including a sound-receiving portion 110, an extension portion 120 and a headphone connecting portion 130.

The sound-receiving portion 110 has a sound-receiving component for obtaining sound information including the user's voice and the surrounding sound. The sound-receiving components can be of those types commonly used in the art, and in particular, one could select the sound-receiving components that have a strong directional sound-receiving property.

The extension portion 120 connects the distal end 121 and the proximal end 122 opposite to the distal end 121 thereof. The distal end 121 is arranged to be connected with the sound-receiving portion 110. The proximal end 122 extends a certain distance from the distal end 121 and is arranged to be connected to the headphone connecting portion 130, such that a user's voice signal received is greater than the environmental noise received thus yielding a higher signal to noise ratio. In a preferred embodiment, the extension portion 120 is a hollow tubular member, and a microphone signal wire is arranged in the hollow tubular member, and the microphone signal wire connects the output of the sound-receiving component to the headphone connector 131. More preferably, the hollow tubular member is a conductor. It should be understood at this point that the extension portion 120 can be bendable and adjustable, and for example, may preferably be made of flexible plastic or an alloy with multiple conductors provided therein.

The headphone connecting portion 130 is connected to the proximal end 122 of the extension portion 120. The headphone connecting portion 130 is provided with the headphone connector 131, which is configured such that the microphone 100 is detachably connected to the headphone 200 via the headphone connector 131. The headphone connector 131 includes a ferromagnetic material configured to engage with the headphone 200 via the microphone connector 221 provided thereon (please refer to FIG. 3). Selected example of the ferromagnetic material can be transition metal including but not limited to iron, cobalt, oxides thereof, and alloys thereof, magnet, magnetic tape, magnetic interface, and etc. In a preferred embodiment, the headphone connector 131 may be embedded in the surface of the headphone connecting portion 130. Still in FIG. 4, although there are 3 headphone connectors 131 in the headphone connecting portion 130, it should be understood that those skilled in the art could adjust the number of headphone connectors 131 according to actual needs, for example, the features or functions provided by the microphone. Preferably, in one embodiment, the number of the microphone connector 221 is the same as that of the headphone connector 131.

It should also be understood at this point that the shape of the microphone shown in the drawings is only for illustrative purpose, and it shall not be construed as limitation to those skilled in the art to select microphones with other shapes according to actual needs.

In a preferred embodiment, advantageously, the headphone connecting portion 130 and the microphone connecting portion 220 may be respectively provided with magnets. Or, in an alternative embodiment, at least one of the ferromagnetic materials of the headphone connector 131 and the ferromagnetic material of the microphone connector 221 is a magnet.

In a preferred embodiment, the magnets of the microphone 100 and the headphone 200 can thus adapt only one single mating relationship therebetween, so that the microphone 100 is only allowed to connect with the headphone 200 in one single orientation. In an alternative embodiment, there may be more than one mating relationship between the microphone 100 and the headphone 200, thereby still allowing adjusting the mating angle of the microphone 100 and the headphone 200.

Figure 5:
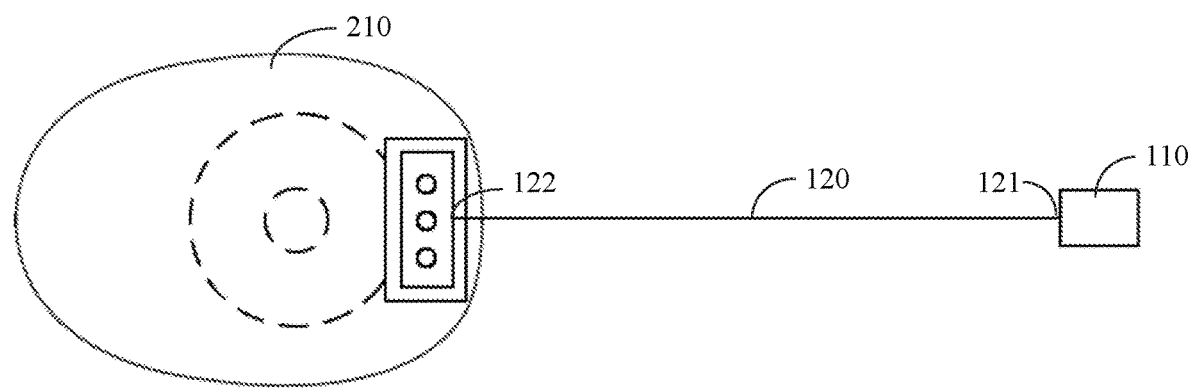

FIG. 5 is a schematic diagram of the headphone in FIG. 3 and the microphone in FIG. 4 after being assembled. The embodiment in FIG. 5 shall not be understood as a constrain to practice the invention disclosed in this specification. It shall be understood that the headphone 200 can be used independently to the microphone 100.

The microphone described herein specifically addresses to those plug-in type boom microphone with 0.7 mm tube in the market. Although the described herein relates to the plug-in type boom microphone with 0.7 mm tube, those skilled in the art should understand that the spirit of the subject invention shall not be construed to limit the subject invention as an alternative to those plug-in type boom microphone with 0.7 mm tube only but also to other plug-in type boom microphones with different dimension tubes. When the plug-in type boom microphone is in use, it makes the overall assembly bulk in size with poor aesthetic effect. In contrast, when the subject invention is in use, users can magnetically attach the boom microphone as shown in FIG. 4 to the headphone, thereby detachably securing the microphone to the desirable position predefined on the headphone, allowing users to directly attach the microphone to the headphone without the need to take the headphone off which is already attached to the user's ear. It specifically provides remarkable convenience in communications, gaming, and e-sports, with which e-sport players playing require instant, accurate, and quick-fit attachment between two components.

In one embodiment, the magnetic interaction between the microphone connector 221 and the headphone connector 131 not only provides mechanical attachment therebetween, but also enables signal transfer therebetween. In the same embodiment, in a state where the microphone 100 is mechanically connected to the headphone 200, the microphone connector 221 and the headphone connector 131 are electrically coupled to each other, thereby transmitting signal between the microphone connector 221 and the headphone connector 131. For example, in the preferred embodiment shown in the figures, the transmission component sequentially receives the signal from the sound receiving component via, the microphone signal wire connected to the sound receiving component, the headphone connector 131, the microphone connector 221 and the headphone signal wire.

Figure 6:
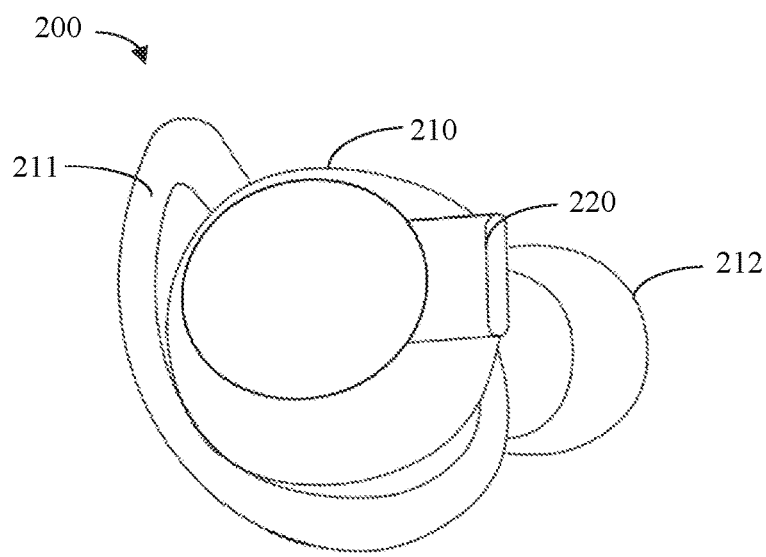
Figure 7:
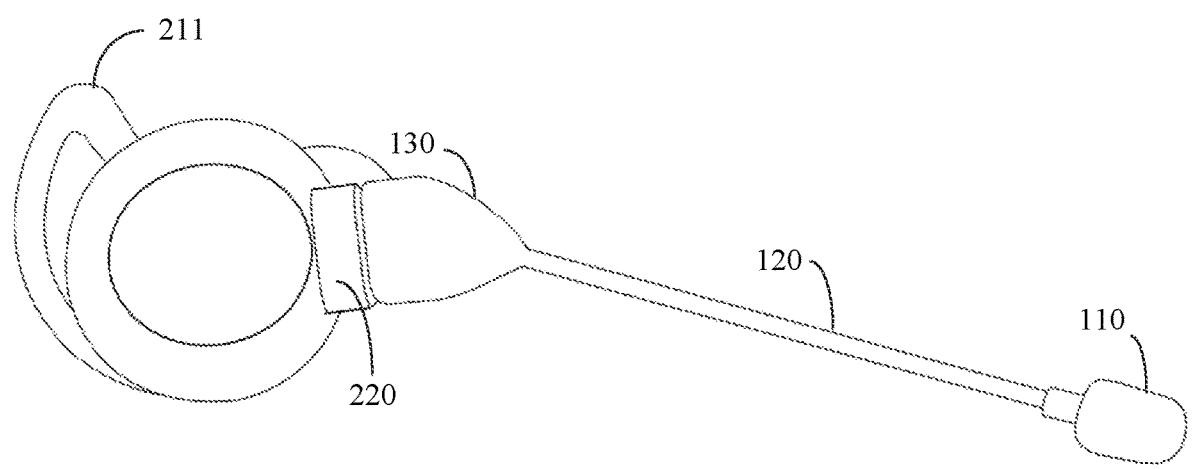

When comparing with the single use of the headphone 200, that means, without attaching the headphone 200 to the microphone 100, the assembly of the embodiment illustrated in FIG. 5 increases the overall weight and shifts the center of the overall mass, thereby it would be relatively easy for the assembly to detach from the ear, bringing inconveniences to users when the assembly in FIG. 5 is in use. To enhance the anchoring performance of the headphone 200 to the ear, it is advantageously to provide the headphone 200 with a ergonomic ear contour retaining portion, as illustrated in FIGS. 6 and 7. FIG. 6 is a schematic diagram of a headphone according to another preferred embodiment of the present invention, and FIG. 7 is a schematic diagram of the headphone of FIG. 6 being assembled with a microphone according to another preferred embodiment of the present invention. The headphone 200 in FIG. 6 is provided with a ergonomic ear contour retaining portion 211 attached to the main body portion of the headphone 200 for enhancing the attachment of the headphone to the ear. It should be noted at this point that those skilled in the art can also envisage other shapes of retaining portion to provide such an improved anchoring effect to the headphone. Still in FIG. 6, the microphone connecting portion 220 includes an outwardly facing aperture for accommodating the microphone connector 221 embedded therein. The headphone connecting portion 130 includes an outwardly facing aperture for accommodating the headphone connector 131 embedded therein. As shown in FIG. 7, the assembly shows that the position of the outwardly facing aperture of the microphone connecting portion 220 corresponds to the position of the outwardly facing aperture of the headphone connecting portion, such that the magnetic connection between the headphone connector 131 and the microphone connector 221 is out of sight, providing better aesthetic effect, mechanical stability between the magnetic connection, and environmental protection from such things as water ingress.

While preferred embodiments of the present disclosure have been described in detail by the examples, it is apparent that modifications and adaptations will occur to those skilled in the art. Furthermore, the above-described embodiments shall not be interpreted to be restricted by the examples or figures only. It is to be expressly understood, however, that such modifications and adaptations are within the scope of the present disclosure, as set forth in the following claims. For instance, features illustrated or described as part of one embodiment can be used on another embodiment to yield a still further embodiment. Thus, it is intended that the present disclosure cover such modifications and variations as come within the scope of the claims and their equivalents.

The invention claimed is:

1. A kit, comprising a case member, a microphone, and a wireless headphone, wherein:
    said case member is provided with a first cut-out region for accommodating said microphone and a second cut-out region for accommodating said wireless headphone, and is provided with electronics means for charging said microphone and/or said wireless headphone;
    said microphone comprising: a sound-receiving portion, having a sound-receiving component for receiving external sound information; a headphone connecting portion; an extension portion connecting a distal end and a proximal end opposite said distal end thereof, said distal end is arranged to connect to said sound-receiving portion, said proximal end extending a distance from said distal end and is arranged to connect to said headphone connecting portion, such that a user's voice signal received is greater than the environmental noise received thus yielding a higher signal to noise ratio; and
    said wireless headphone comprising: a main body portion dimensioned for adapting to the user's ear contour to retain said wireless headphone on the ear; a microphone connecting portion provided on said main body portion;
    wherein each of said headphone connecting portion and said microphone connecting portion is provided with magnets, when said microphone is in use, said microphone is arranged to detachably connect to said wireless headphone by means of their respective said magnets, thereby said magnets of said microphone and said wireless headphone are configured to adapt only one single mating relationship therebetween, allowing said microphone connected to said wireless headphone only in one single orientation.

2. A microphone for a headphone, comprising:
    a sound-receiving portion, comprising a sound-receiving component for obtaining external sound information;
    an extension portion, having a distal end and a proximal end opposite said distal end, said distal end is connected to said sound-receiving portion and said proximal end extends a distance from said distal end such that a user's voice signal received is greater than the environmental noise received thus yielding a higher signal to noise ratio; and
    a headphone connecting portion, connected to said proximal end of said extension portion, said headphone connecting portion is provided with a headphone connector, said headphone connector comprises ferromagnetic materials which are configured to engage with a microphone connector on said headphone and is configured so that said microphone is detachably connected to said headphone by means of said headphone connector.

3. The microphone for a headphone according to claim 2, characterized in that,
    said microphone connector comprises ferromagnetic materials, and at least one of the ferromagnetic materials of said headphone connector and the ferromagnetic materials of said microphone connector are magnets.

4. The microphone for a headphone according to claim 3, characterized in that,
    said headphone connector is embedded in the surface of said headphone connecting portion.

5. The microphone for a headphone according to claim 2, characterized in that,
    said extension portion is a hollow tubular member that is provided with a microphone signal wire, said microphone signal wire couples the output of said sound-receiving component to said headphone connector.

6. The microphone for a headphone according to claim 5, characterized in that,
    said hollow tubular member is a conductor.

7. A kit, comprising:
    the microphone for a headphone according to claim 2;
    wherein said headphone connector and said microphone connector can be detachably connected to each other.

8. The kit according to claim 7, characterised in that,
said headphone connector and said microphone connector are configured so that only one single mating relationship exists therebetween, such that said microphone is connected to said headphone only in one single orientation.

9. The kit according to claim 7, characterized in that,
in a state where said microphone is connected to said headphone, said microphone connector and said headphone connector are electrically coupled to each other, whereby signals transmitted between said microphone connector and said headphone connector.

10. A headphone comprising:
a main body portion, sized and shaped for adapting to a user's ear contour to retain said headphone in the ear;
a microphone connecting portion, provided on said main body portion, said microphone connecting portion is provided with a microphone connector, said microphone connector comprises ferromagnetic materials which are configured to engage with a headphone connector on said microphone and is configured such that said headphone is detachably connected to a microphone by means of said microphone connector.

11. The headphone according to claim 10, characterized in that,
said headphone connector comprises ferromagnetic materials, and at least one of the ferromagnetic materials of said headphone connector and the ferromagnetic materials of said microphone connector are magnets.

12. The headphone according to claim 10, characterized in that,
said headphone further comprises a transmission component for transmitting signals to and/or receiving signals from the outside, said transmission component is coupled to said microphone connecting by means of a headphone signal wire.

13. The headphone according to claim 12, characterized in that,
said main body portion provided with an ergonomic ear contour retaining portion attached to said main body portion for enhancing the attachment of said headphone to the ear.

14. The headphone according to claim 13, characterized in that,
said microphone connecting portion comprises an insertion hole provided on said main body portion, said microphone connector is embedded in the inner surface of said insertion hole.

15. A kit, comprising:
the headphone according to claim 10;
wherein said headphone connector and said microphone connector can be detachably connected to each other.

* * * * *